(12) United States Patent
Arnold

(10) Patent No.: US 7,905,267 B2
(45) Date of Patent: Mar. 15, 2011

(54) HANDHELD WELDING TOOL WITH EXTERNAL AIR SUPPLY

(75) Inventor: Hans Arnold, Alpnach (CH)

(73) Assignee: LEISTER Process Technologies, Kägiswil (CH)

( * ) Notice: Subject to any disclaimer, the term of this patent is extended or adjusted under 35 U.S.C. 154(b) by 356 days.

(21) Appl. No.: 12/129,306

(22) Filed: May 29, 2008

(65) Prior Publication Data
US 2008/0295971 A1 Dec. 4, 2008

(30) Foreign Application Priority Data
May 30, 2007 (DE) .................... 20 2007 007 469 U

(51) Int. Cl.
*B32B 37/00* (2006.01)
(52) U.S. Cl. .................... 156/497; 156/499; 156/579
(58) Field of Classification Search ............... 156/71, 156/82, 497, 499, 574, 579
See application file for complete search history.

(56) References Cited

U.S. PATENT DOCUMENTS

| 4,260,439 A * | 4/1981 | Speer ............................. 156/98 |
| 6,431,409 B1 | 8/2002 | Gehde |
| 2007/0012306 A1* | 1/2007 | Looft .............................. 126/6 |

FOREIGN PATENT DOCUMENTS
DE 299 15 768 U1 10/2000

* cited by examiner

*Primary Examiner* — James Sells
(74) *Attorney, Agent, or Firm* — Renner, Otto, Boisselle & Sklar, LLP

(57) ABSTRACT

The invention relates to a handheld welding tool with external air supply for welding thermoplastic synthetic material, with a preferably wand-shaped housing containing at least one hot air generating device, and with flexible supply lines for air and power supply that are combined in a supply line package. The supply lines of the supply line package are connected with rear connection elements on the housing, to the supply line for the air supply encasing the power supply line as a sheath. The invention proposes to connect the supply line package rotatably to a common rear non-rotatable connection piece of the housing. This makes it possible to rotate the handheld welding tool with little force in relation to the supply line package in order to facilitate the handling of the handheld welding tool.

10 Claims, 3 Drawing Sheets

HANDHELD WELDING TOOL WITH EXTERNAL AIR SUPPLY

CROSS-REFERENCE TO RELATED APPLICATION

The present application claims priority under 35 U.S.C. §119 to German Patent Application No. 20 2007 007 469.7, filed on May 30, 2007, the entire disclosure of which is incorporated herein by reference.

TECHNICAL FIELD OF INVENTION

The invention relates to a handheld welding tool with external air supply for welding thermoplastic synthetic material, with a preferably wand-shaped housing containing at least one hot air generating device, and with flexible supply lines for air and power that are combined in a supply line package, where the supply lines are connected by rear connection elements on the housing, and where, in the supply line package, the air supply line encases the power supply line as a sheath.

DISCUSSION OF RELATED ART

Handheld welding tools with external air supply for welding plastic sheet, plastic film, or other plastic work pieces are known per se. They exist in a wide variety of embodiments, with or without an extrusion device for plastified synthetic material. Depending on the application, the welding process of a handheld welding tool with external air supply is performed by means of hot air only, or by means of a strand of plastified synthetic material in conjunction with hot air.

Handheld welding tools of this type are usually equipped with a hot air generating device by means of which air pulled in by a blower is heated by means of an electrical resistance heating element and is then expelled at the outlet of a passage channel in order to preheat the plastic work pieces to be welded in the area of the intended welding seam. In many cases, the blower is not part of the handheld welding tool so that the air must be supplied to the heating device by a separate blower or a source of compressed air via a hose.

DE 299 15 768 U1 specifies a handheld welding tool with external air supply with an extruder screw for the welding of thermoplastic synthetics. The disclosed handheld welding device comprises a handheld welding unit and a supply unit for the welding unit that are positioned at a distance from each other and are connected by means of flexible supply lines. In the welding device specified there, a plastifier screw unit, the hot air generating device, and a drive motor for driving the extruder screw are located in an oblong housing, with the supply unit comprising control devices for the heating systems of the plastifier screw unit and the hot air generating device as well as for the conveying speed of a fluid motor that drives a screw of the plastifier screw unit. The supply lines from the supply unit to the welding unit of the handheld welding device include electrical, hydraulic, and pneumatic lines. These are combined in a supply line package with a common sheath that holds the individual connecting lines together. Inside the sheath, the individual supply lines run parallel to each other, and at their ends are positively connected—specifically without the ability to rotate—to the connectors, arranged side by side, of the supply unit and the welding unit.

Handheld welding tools with external air supply that produce hot air exclusively are known to have the electrical supply line integrated in an air hose.

Such an embodiment of the supply line package and its connection to the oblong housing of the handheld welding unit has disadvantages in several respects. Among other things, it is not very handy because the handheld welding unit can not be rotated without the supply line package exerting a counterforce, and is therefore of limited suitability for use in inaccessible places. Also, it does not allow fatigue-free working for longer periods of time, and does not counteract the danger of an impaired function of the supply lines due to kinking. It also does not exclude damage to the supply lines. In known devices of this type, braided metal is added to the hose to stiffen it in order to avoid kinking.

Based on this prior art, the invention addresses the problem of devising an improved handheld welding tool with external air supply with a preferably wand-shaped housing where the handheld welding tool can be rotated relative to the supply line package with little force in order to facilitate the handling of the handheld welding tool.

SUMMARY OF THE INVENTION

According to the invention, this problem is solved by a handheld welding tool with external air supply with the characteristics of claim 1. Additional advantageous embodiments can be found in the dependent claims.

The handheld welding tool with external air supply according to the invention, with a preferably wand-shaped housing, has supply lines that are combined in a supply line package that is connected rotatably relative to the housing, to a rear non-rotatable connection piece of the housing.

In addition to the electric power supply line for supplying power to the handheld welding tool, the supply line for the supply of external air that is implemented in the form of a hose line may also contain electrical control and/or signal lines as well as additional hose lines for liquid or gaseous materials. The individual supply lines encased in the supply line for the air supply may be connected individually with the housing of the handheld welding tool by means of a fixed or rotary connection.

The rear, non-rotatable connection piece for admitting the compressed air to the housing of the handheld welding tool is essentially tube-shaped. Inside, it has a central passage, and on the outside it is undercut for securing a hose line. The shape of the undercut on the connection piece is commonly known from hose line connectors. The supply line for the air supply is rotatably connected to the connection piece while the connection piece itself is immovable in relation to the housing. The other supply lines of the supply line package encased in the air supply line enter the handle section of the housing through the passage opening of the connection piece.

Advantageously, a preferably angled rotatable connection flange is attached to the non-rotatable connection piece. The rotatable connection flange serves for the attachment of the supply line for the air supply of the handheld welding tool. With a front end, the connection flange overlaps the connection piece and preferably engages an undercut of the connection piece. For attaching the hose line, the shape of the rear end of the connection flange is similar to the rear end of the connection piece. It has the shape of a hose connector for attachment of the air supply. The encasing supply hose line can thereby be attached in familiar fashion to the connection flange in a twist-proof and pressure-tight manner by means of a hose clamp.

Like the connection piece, the connection flange has a central passage through which the at least one encased supply line, specifically the power supply line, is run into the housing. The central supply lines of the supply line package are loose in relation to the sheath, the connection piece and the connection flange. As a consequence, the wand-shaped housing and the supply line for the air supply are able to rotate without restraint relative to each other, with a torsion of the more flexible inner electrical supply line taking place inside the stiffer air supply line that is inflated by the supplied compressed air. In order to prevent the inner supply line from twisting in a spiral, it proved to be expedient to provide a rotation stop for the rotatable connection flange on the housing or on the immovable connection piece of the welding tool that will restrict the rotation of the connection flange.

In a preferred embodiment of the invention, the connection piece and the connection flange are arranged in an axial longitudinal direction at the rear end of the wand-shaped housing. They extend the wand-shaped housing in the direction of the supply line package and do not protrude laterally from the housing. This permits unimpeded working even in inaccessible or tight welding locations, in that the housing can be rotated relative to the supply line package against a low counterforce. This also significantly reduces the danger of kinking the supply line package. For ergonomic reasons, the connection flange may be angled so that the supply line package can be connected to the housing laterally.

In an implementation of the invention, provision is made for placing a cup-shaped gasket with a preferably centric bottom opening between the connection piece and the connection flange, which cup-shaped gasket is held by the connection flange and contacts the face and the circumference of the connection piece. The cup-shaped gasket overlaps the connection piece at its free end, with the centric bottom opening coinciding with the passage openings of the connection piece and the connection flange. The at least one electrical supply line of the handheld welding tool passes through the central bottom opening. The interior surfaces of the cup-shaped gasket match the shape of the connection piece and are pressed against the connection piece. The gasket provides an airtight seal of an annular gap between the connection piece and the connection flange. The sealing function of the gasket is not impaired by the rotation or twisting of the connection flange relative to the connection piece.

Preference is given to an embodiment where the connection flange is formed by two half shells that can be placed on the connection piece perpendicular to the longitudinal axis. This permits a simple structure of the connection flange, without moving locking elements for its attachment to the connection piece, and, therefore, low manufacturing costs. By means of connecting elements, the two half shells can be joined in one unit. The connecting elements can be molded into the half shells, or may be provided as separate parts, including all methods of connection known to a person skilled in the art. Preferably, the connecting elements also permit the necessary separation of the half shells, for example for the purpose of repairs, or for the conversion of existing handheld welding tools with external air supply.

The connection flange of the handheld welding tool according to the invention that can be rotatably attached to the non-rotatable connection piece of the wand-shaped housing is suitable as adapter kit for a handheld welding tool according to claim 1. The adapter kit with which a handheld welding tool with the characteristics of the specification of claim 1 can be converted comprises at least the following parts:

a connection flange that can be separated in a longitudinal direction whose connection flange components can be placed around the connection piece, perpendicular to a longitudinal axis of the connection piece;
  connecting elements for the connection flange components;
  a cup-shaped gasket with a preferably centric bottom opening for sealing an air gap between the connection piece and the connection flange;
  an axial clamping element that can be placed between the gasket and the housing for fixing the connection flange axially on the connection piece.

The connection flange that can be separated in a longitudinal direction may comprise two half shells or more shell components that can be connected to each other, preferably non-permanently, by means of connecting elements to form a whole. The connection can be accomplished with simple means, for example by means of bolting, clamping, or latching. Preferably, the cup-shaped gasket is made of one piece and can be pushed onto the connection piece from the free end of the connection piece until it rests against its circumference and its face. For axially fixing the connection flange, a special clamping element is provided, for example a circlip, that, when expanded, can be placed with clamping action on the connection flange between the gasket and the housing. After it is placed on the cylindrical part of the connection flange, the circlip is positively connected with the connection flange. An annular groove on the inner circumference of the front section of the connection flange is associated with the circlip; when the connection flange components are assembled, this annular groove can be made to engage the circlip. When engaged, the connection flange and the connection piece are positioned and fixed relative to each other in such a way that the cup-shaped gasket is compressed on the face side and on the circumferential surfaces. The sealing effect is further supported by inclined planes of the gasket and the connection flange that are associated with each other.

Below, the invention is described in detail with reference to an embodiment example shown in the drawing. Additional characteristics of the invention are explained in the following description of the embodiment example in conjunction with the claims and the attached drawing. In different embodiments of the invention, the individual characteristics may be realized by themselves or in combinations thereof.

DETAILED DESCRIPTION OF THE INVENTION

Figure 1:
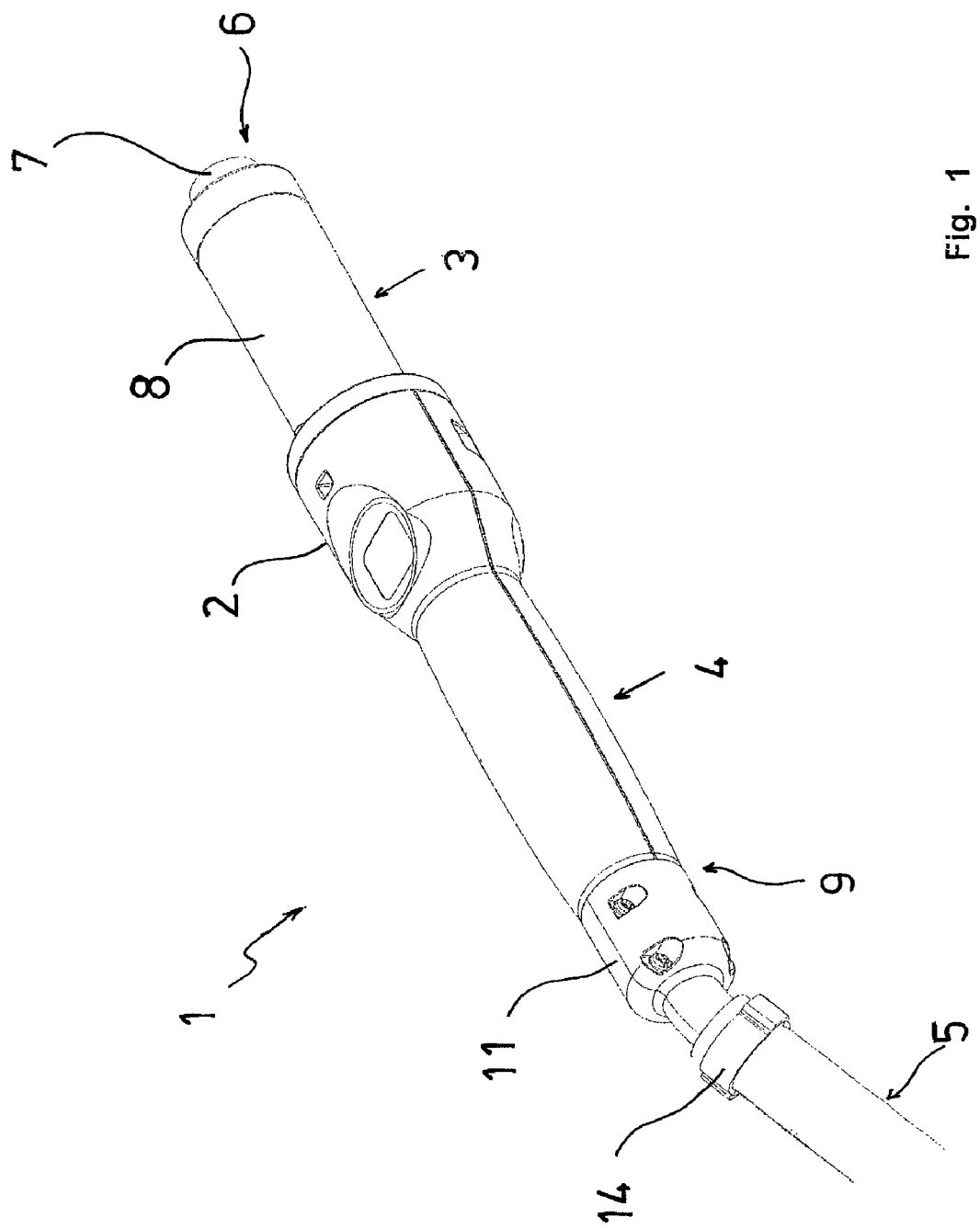
FIG. 1 shows a perspective view of a handheld welding tool according to the invention for welding exclusively with hot air.
Figure 2:
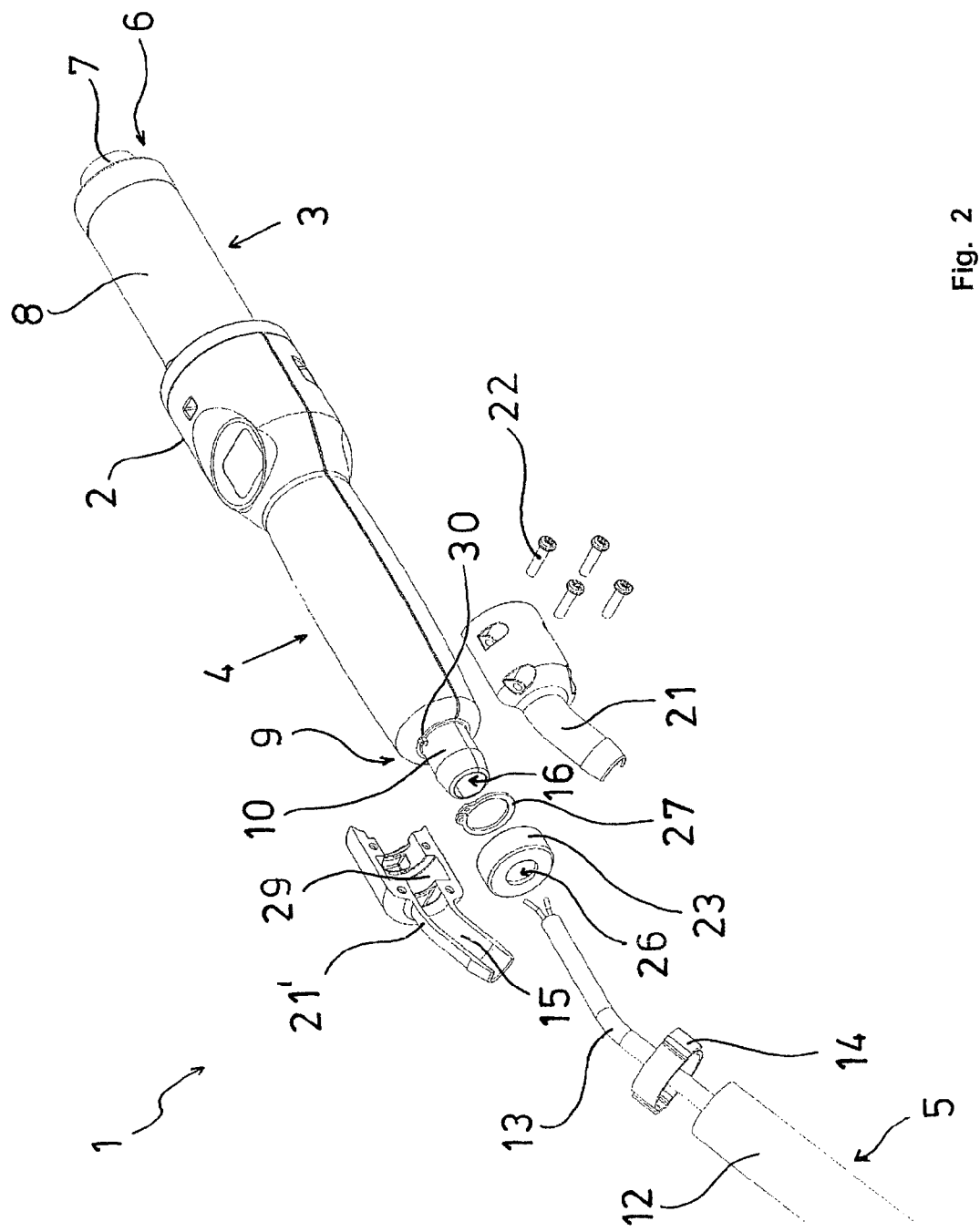
FIG. 2 shows an exploded view of the connection side of the handheld welding tool in FIG. 1.

FIGS. 1, 2 show a handheld welding tool 1 according to the invention with a wand-shaped housing 2 that has a welding section 3 or a handle section 4. In the welding section 3, a hot air generating device (not shown) is located that is supplied with compressed air via a supply line package 5. The supplied cold air is fed to the hot air device via an air channel (not shown) in the housing 2, and exits as hot air from a front end 6 of the welding section 3 at an outlet nozzle 7 as a jet of hot air. The housing 2, being hot in the area of the welding section 3, is surrounded by a cooled protective tube 8 extending from the handle section 4 to the outlet nozzle 7. Due to its long and slender configuration, the preferably wand-shaped housing can also be used in locations where space is limited. In addition, a handle (not shown) extending laterally from the housing, as known from other devices, may be provided for easier handling.

Figure 3:
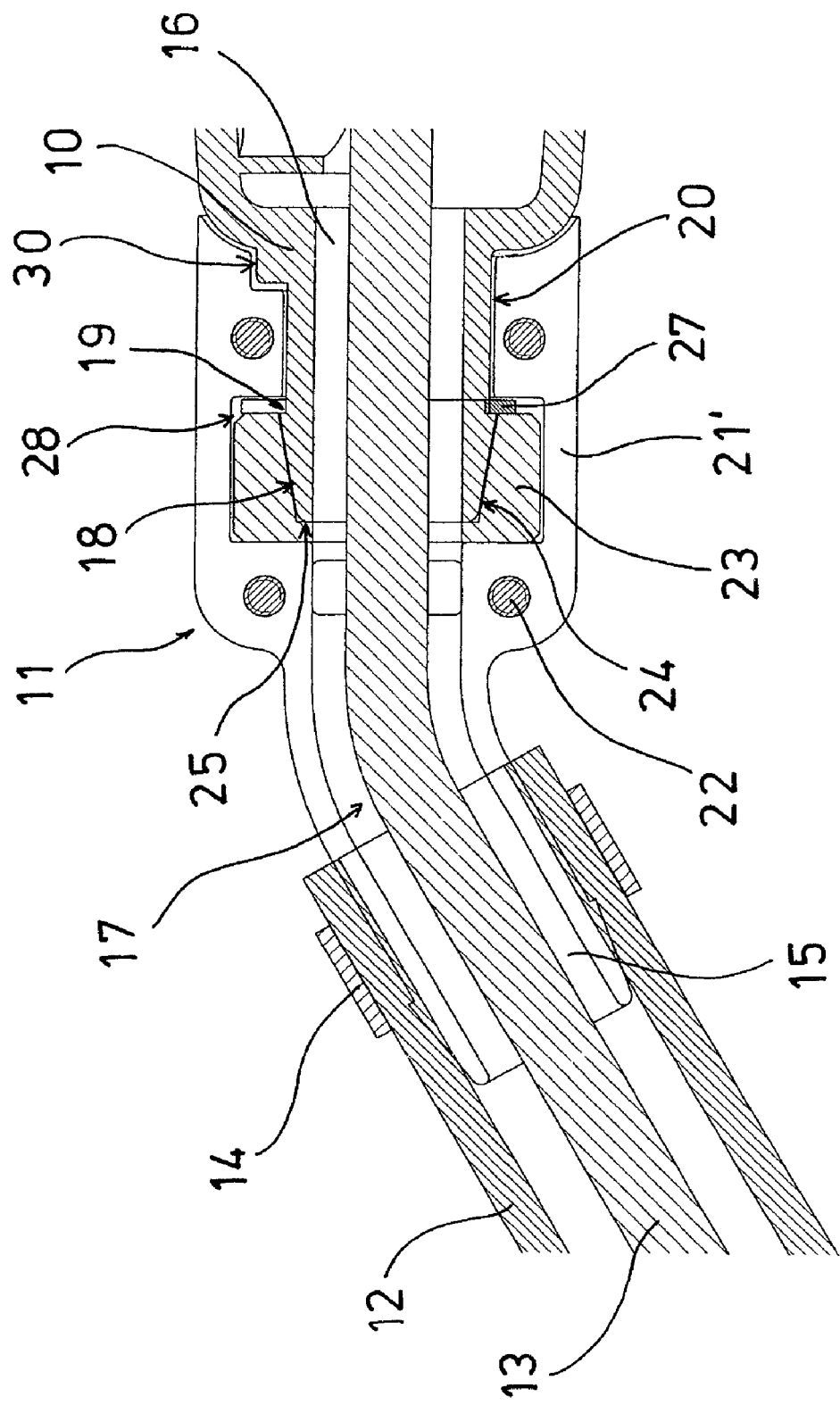
FIG. 3 shows the enlargement of a detail of the rear end of the handheld welding tool in FIG. 1 in an axial section view.

The supply line package 5 is rotatably connected with the handle section 4. For this purpose, at a rear end 9, the housing 2 as shown in FIGS. 2, 3 has a non-rotatable connection piece 10 that is connected positively to the housing 2 and carries a rotatable connection flange 11. The supply line package 5 is connected with the connection flange 11. As shown by the FIGS. 2, 3, the supply line package 5 comprises a supply line 12 for the air supply and a supply line 13 for the power supply of the welding tool 1. The electrical supply line 13 is located inside the pneumatic supply line 12 that encases the supply line 13 over its entire length. The supply line 12 for the air supply forms a sheath for the supply line package 5 and is attached twist-proof and pressure-tight to the connection flange 11 with a hose clamp 14.

The electrical supply line 13 runs through the connection piece 10 and the connection flange 11 to the handle section 4 and from there to the hot air generating device. For this purpose, the connection flange 11 and the connection piece 10 have passage openings 15, 16 in which the supply line 13 runs concentrically, determining an annular air channel 17. The connection piece 10 has a straight, essentially cylindrical shape with an inclined plane 18, an undercut 19, and a cylindrical section 20 on the outside.

The rotatable connection flange 11 is formed by two half shells 21, 21' that are held together by four screws 22. For ergonomic reasons, it has an angled design. Between the connection flange 11 and the connection piece 10, a cup-shaped gasket 23 is provided that seals an air gap 24 between the rotatable connection flange 11 and the inclined plane 18 and the face 25, respectively, of the connection piece 10. The gasket 23 has a centric bottom opening 26 as a passage for the supply line 13 and as a passage for the cold compressed air supplied by means of the supply line 12. A stop 30 on the connection piece 10 engages the half shells 21, 21', preventing excessive rotation.

The axial position of the connection flange 11 in relation to the connection piece 10 is fixed by a clamping element 27 in the form of a circlip. The circlip 27 exerts a clamping force on the cylindrical section 20 and engages an annular groove 28 on the inside of the connection flange 11. It positions the two half shells 21, 21' that can be placed onto the connection piece 10 perpendicular to the handle section 4 in such a way that the gasket 23 is pressed with a sealing effect against the connection piece 10 and the wall of a receptacle space 29 for the gasket 23 on the inner circumference of the connection flange 11.

The invention claimed is:

1. A handheld welding tool with external air supply for welding thermoplastic synthetic material, comprising a housing containing at least one hot air generating device, and flexible supply lines for air and power supply that are combined in a supply line package, where the supply lines are connected to rear connection elements on the housing, and where, in the supply line package, the air supply line encases the power supply line as a sheath, and the supply line package is connected, rotatably relative to the housing, to a rear non-rotatable connection piece of the housing.

2. A handheld welding tool as claimed in claim 1, wherein a rotatable connection flange is attached to the non-rotatable connection piece.

3. A handheld welding tool as claimed in claim 2, wherein the connection piece and the connection flange are arranged in an axial longitudinal direction at the rear end of the wand-shaped housing.

4. A handheld welding tool as claimed in claim 2, wherein a cup-shaped gasket with a bottom opening is provided between the connection piece and the connection flange, which cup-shaped gasket is held by the connection flange and rests on the face and the circumference of the connection piece.

5. A handheld welding tool as claimed in claim 2, wherein the rotatable connection flange has two half shells that can be placed on the connection piece perpendicular to the longitudinal axis.

6. An adapter kit for a handheld welding tool as claimed in claim 1 with a connection flange that can be rotatably attached to the non-rotatable connection piece of the wand-shaped housing, wherein
   the connection flange can be separated in a longitudinal direction whose connection flange components can be placed around the connection piece perpendicular to a longitudinal axis of the connection piece,
   connecting elements for the connection flange components;
   a cup-shaped gasket with a bottom opening, for sealing an air gap between the connection piece and the connection flange; and
   an axial clamping element that can be placed between the gasket and the housing for securing the connection flange axially on the connection piece.

7. A handheld welding tool of claim 1, wherein the housing is wand-shaped.

8. A handheld welding tool of claim 2, wherein the rotatable connection flange is angled.

9. A handheld welding tool of claim 4, wherein the bottom opening is centric.

10. An adapter kit of claim 6, wherein the bottom opening is centric.

* * * * *